(12) United States Patent
Liao

(10) Patent No.: US 10,081,430 B2
(45) Date of Patent: Sep. 25, 2018

(54) COAXIAL DOUBLE LAYER PARACHUTE

(71) Applicant: Shueh-Chih Liao, Taichung (TW)

(72) Inventor: Shueh-Chih Liao, Taichung (TW)

(*) Notice: Subject to any disclaimer, the term of this patent is extended or adjusted under 35 U.S.C. 154(b) by 363 days.

(21) Appl. No.: 14/749,636

(22) Filed: Jun. 25, 2015

(65) Prior Publication Data

US 2016/0376012 A1     Dec. 29, 2016

(51) Int. Cl.
*B64D 17/78*     (2006.01)
*B64D 17/72*     (2006.01)
*B64D 17/04*     (2006.01)

(52) U.S. Cl.
CPC ............ *B64D 17/72* (2013.01); *B64D 17/04* (2013.01)

(58) Field of Classification Search
CPC ........ B64D 17/02; B64D 17/04; B64D 17/14; B64D 17/18; B64D 17/20; B64D 17/78; B64D 17/72; B64B 1/48; B64B 1/58; B64B 1/42; B64B 1/50; B64B 1/20; B64B 1/60
See application file for complete search history.

(56) References Cited

U.S. PATENT DOCUMENTS

| | | | | |
|---|---|---|---|---|
| 2,096,520 A * | 10/1937 | Knight | ................... | B64D 17/00 244/145 |
| 3,350,040 A * | 10/1967 | Sims | ..................... | B64D 17/34 244/113 |
| 3,381,655 A * | 5/1968 | Rozzelle | ................... | B64B 1/62 116/210 |
| 3,521,836 A * | 7/1970 | Struble, Jr. | ............... | B64F 1/14 244/116 |
| 3,679,155 A * | 7/1972 | Centofanti | ............. | B64D 17/78 244/32 |
| 3,866,858 A * | 2/1975 | Rattenberry | .............. | B64B 1/48 116/67 R |
| 4,863,119 A * | 9/1989 | Case | .................... | B64D 17/343 244/149 |
| 6,443,396 B1 * | 9/2002 | Berland | ................. | B64D 17/02 244/145 |
| 2008/0191098 A1 * | 8/2008 | Babovka | ................ | B64D 17/18 244/145 |

* cited by examiner

*Primary Examiner* — Medhat Badawi
*Assistant Examiner* — Vicente Rodriguez
(74) *Attorney, Agent, or Firm* — Bruce Stone LLP; Joseph A. Bruce

(57) ABSTRACT

A coaxial double layer parachute includes an inner inflatable body and an outer canopy which are located along a central axis. Since the inner inflatable body is filled with helium to generate a first buoyance, the inner inflatable body can be obviously lifted to a certain height. When a payload connected to the inner inflatable body and the outer canopy with parachute cords falls, the ambient air flows will enter the inflation space through the annular air inlets to produce a second buoyance, which makes the outer canopy open completely. Hence, a secure descending task from even a very low height can be fulfilled if the coaxial double layer parachute can employed. Apparently, the coaxial double layer parachute can be mainly applied to fire and earthquake rescue actions in the cities when low height deployments, risk-free parachuting, and less complicated manual operation are required.

4 Claims, 4 Drawing Sheets

COAXIAL DOUBLE LAYER PARACHUTE

BACKGROUND OF THE INVENTION

Field of the Invention

The present invention relates to a parachute, and more particularly to a coaxial double layer parachute which can be mainly applied to fire and earthquake rescue actions in the cities when low height deployments, risk-free parachuting, and less complicated manual operation are required.

Description of the Prior Art

Parachute is an aerodynamic decelerator which is fixed to a payload by a connecting member. Hence, the parachute can be deployed to slow down the falling speed of the payload by creating a drag.

However, the deployment of most parachutes requires a great height to carry out parachuting. Second, failure of an operational parachute extraction system causing fatalities and injuries leads to less trust in using parachuting decelerator as a fire escape device. Third, relatively complicated manual operation and skills are required.

The present invention has arisen to practically amend the afore-described disadvantages.

SUMMARY OF THE INVENTION

The primary objective of the present invention is to provide a coaxial double layer parachute which can be applied to fire and earthquake rescue actions.

To achieve the above objective, a coaxial double layer parachute in accordance with the present invention comprises an inner inflatable body and an outer canopy which are located along a central axis. The inner inflatable body can be obviously lift to a certain height since the inner inflatable body is filled with helium, a less dense gas than air, to generate a first buoyance. When the payload connected to the inner inflatable body and the outer canopy falls, the ambient air flows will enter an inflation space via the annular air inlets at the lower end of the outer canopy to produce a second buoyance, which makes the outer canopy open completely. Hence, the coaxial double layer parachute can be applied to the tall buildings where fire and earthquake rescue actions take place because it can be opened automatically without requiring great height, parachuting failure and complicated manual operation.

Preferably, a plurality of fabric panels, peripherally partitioning the lower section of an inflation space into several sectors as air flow tunnels, is outwardly connected to the inside surface of the outer canopy and inwardly connected to the outside surface of the inner inflatable body, so as to prevent the inner inflatable body and the outer canopy from mutual deviation with respect to the central axis during the descent of the coaxial double parachute.

Preferably, the inner inflatable body is provided with an air flow guiding round-nose in the form of an arc-shaped surface to guide air flows to the air inlets effectively.

Preferably, a formed circular plate is disposed between the inner inflatable body and a lower end of the outer canopy to provide much more tensile strength to the structures at the bottom surface of the outer canopy and amid the inner inflatable body.

Preferably, the outer canopy takes the form of a downward tapered surface which can stabilize the entire parachute through the air pressure annularly acting on the downward tapered surface and inside the inflation space between the inner and outer sides of the outer canopy, and reduce unexpected swing during the descent of the parachute.

Preferably, a formed circular plate is provided with a plurality of air inlets, which substitute for the annular air inlets at the bottom surface of the outer canopy, will make the air flow inlets very rigid for withstanding strong air flow and turbulence.

DETAILED DESCRIPTION OF THE PREFERRED EMBODIMENTS

The present invention will be clear from the following descriptions when viewed together with the accompanying drawings, which show, for purpose of illustrations only, the preferred embodiment in accordance with the present invention.

Figure 1:
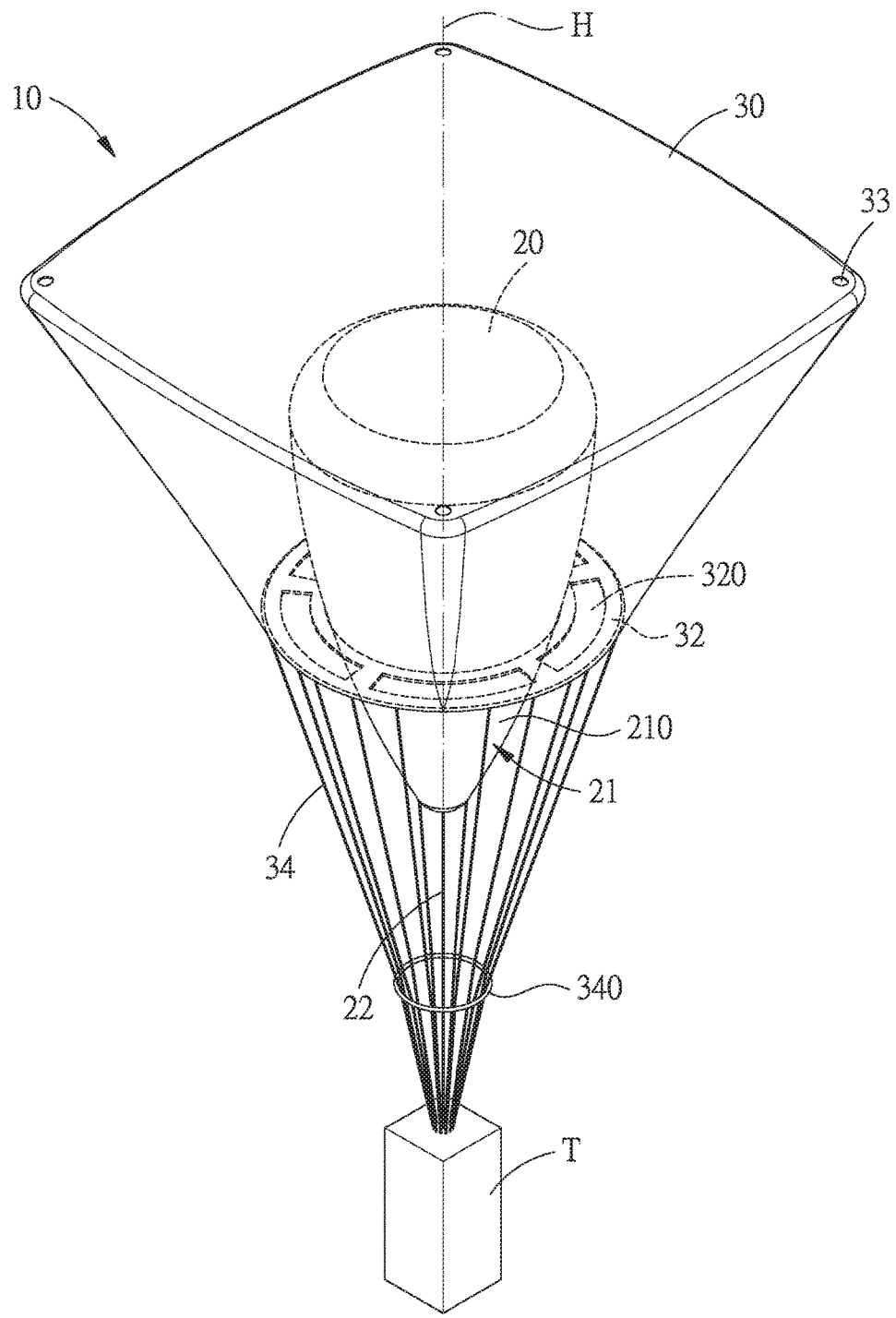
FIG. 1 is a perspective view of a coaxial double layer parachute in accordance with a first embodiment of the present invention.
Figure 2:
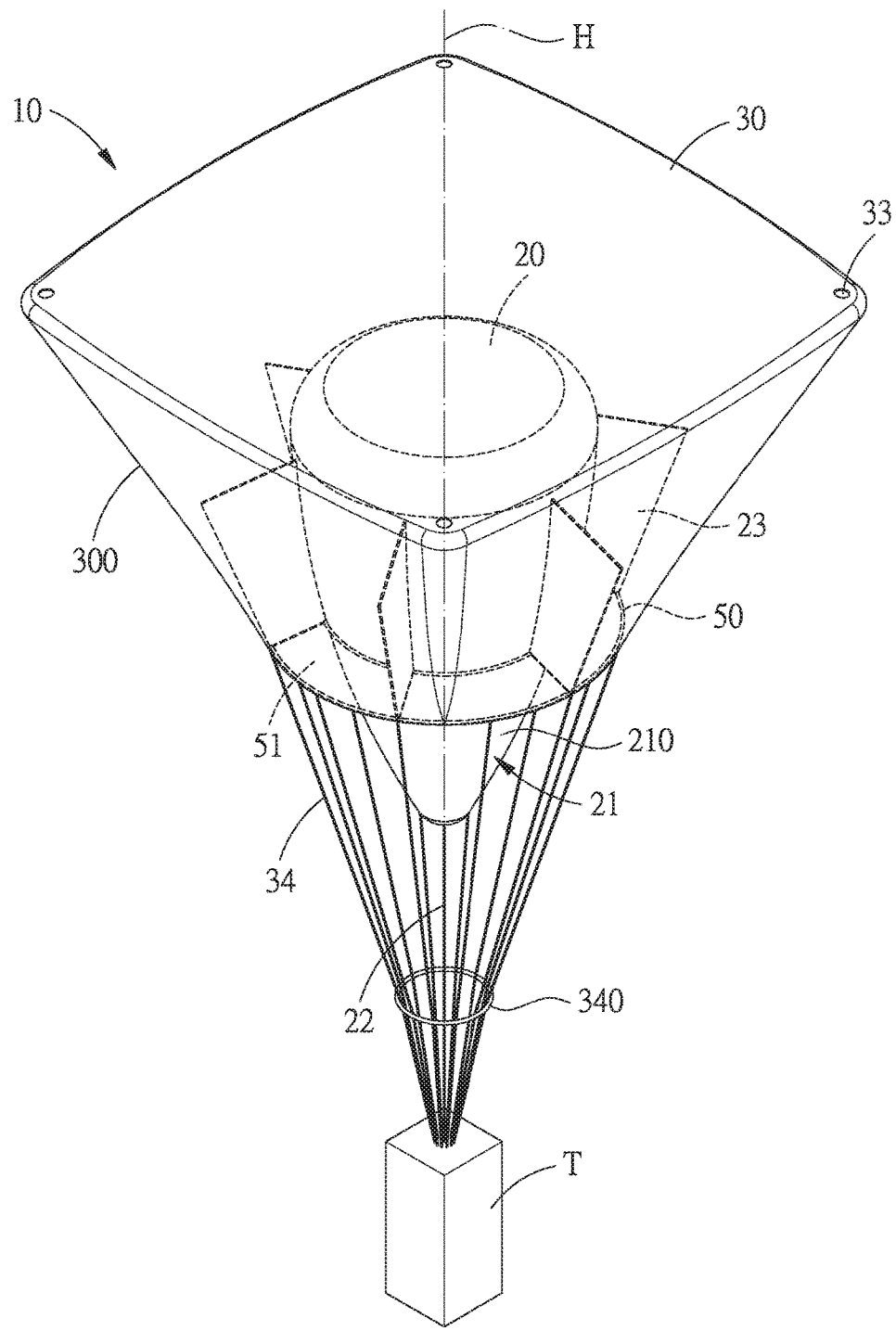
FIG. 2 is a perspective view of a coaxial double layer parachute in accordance with a second embodiment of the present invention.

Referring then to FIG. 2, a coaxial double layer parachute 10 further comprises a plastic ring 50.

The inner inflatable body 20 is further provided with a plurality of flexible pieces 23 around the outer surface of the inner inflatable body 20.

The plastic ring 50 made of rigid material is disposed between the inner inflatable body 20 and a lower end of the outer canopy 30, and provided with a plurality of air inlets 51 which are annularly arranged.

Figure 3:
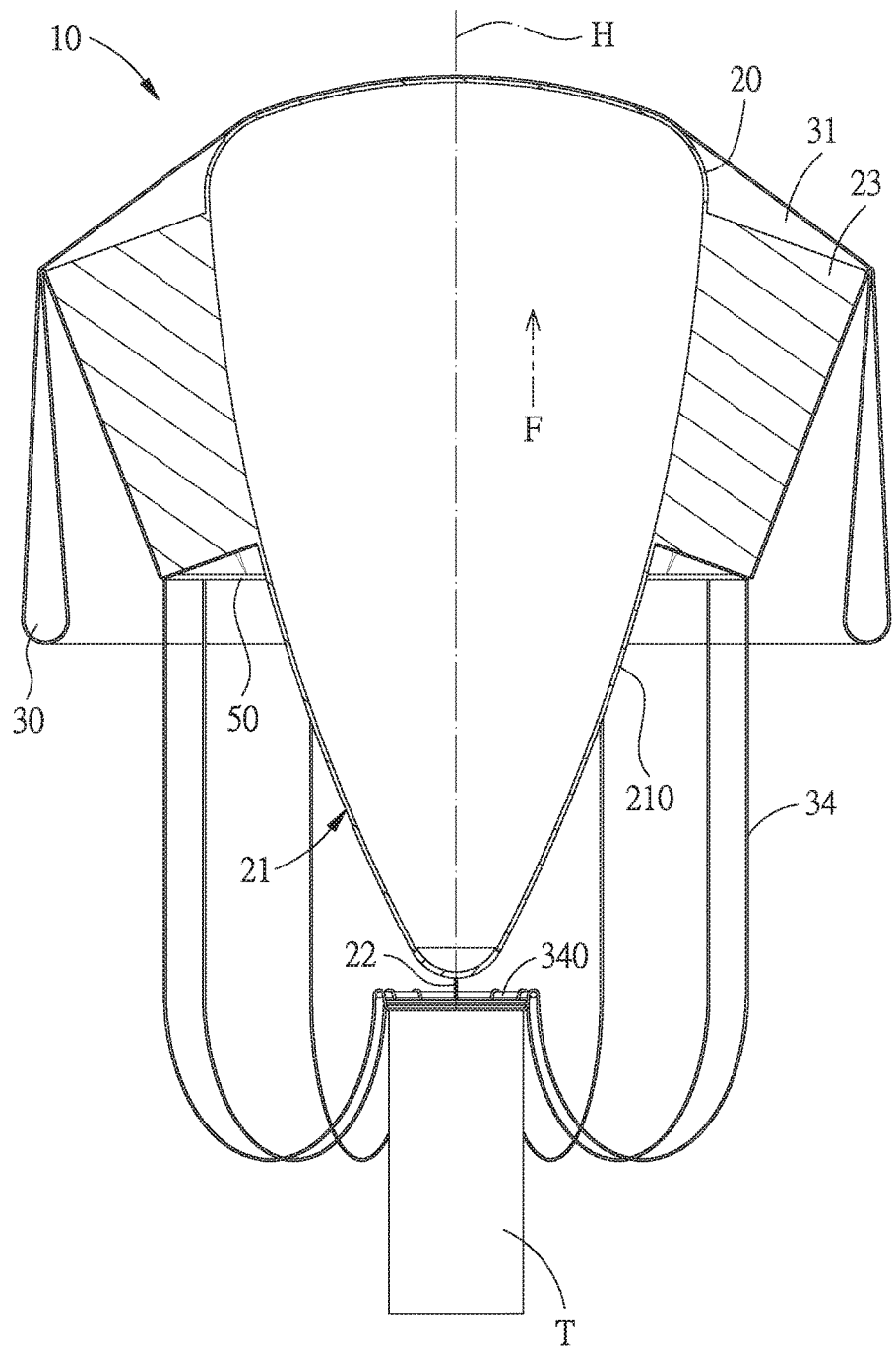
FIG. 3 is a plan view of the coaxial double layer parachute in accordance with the second embodiment of the present invention.
Figure 4:
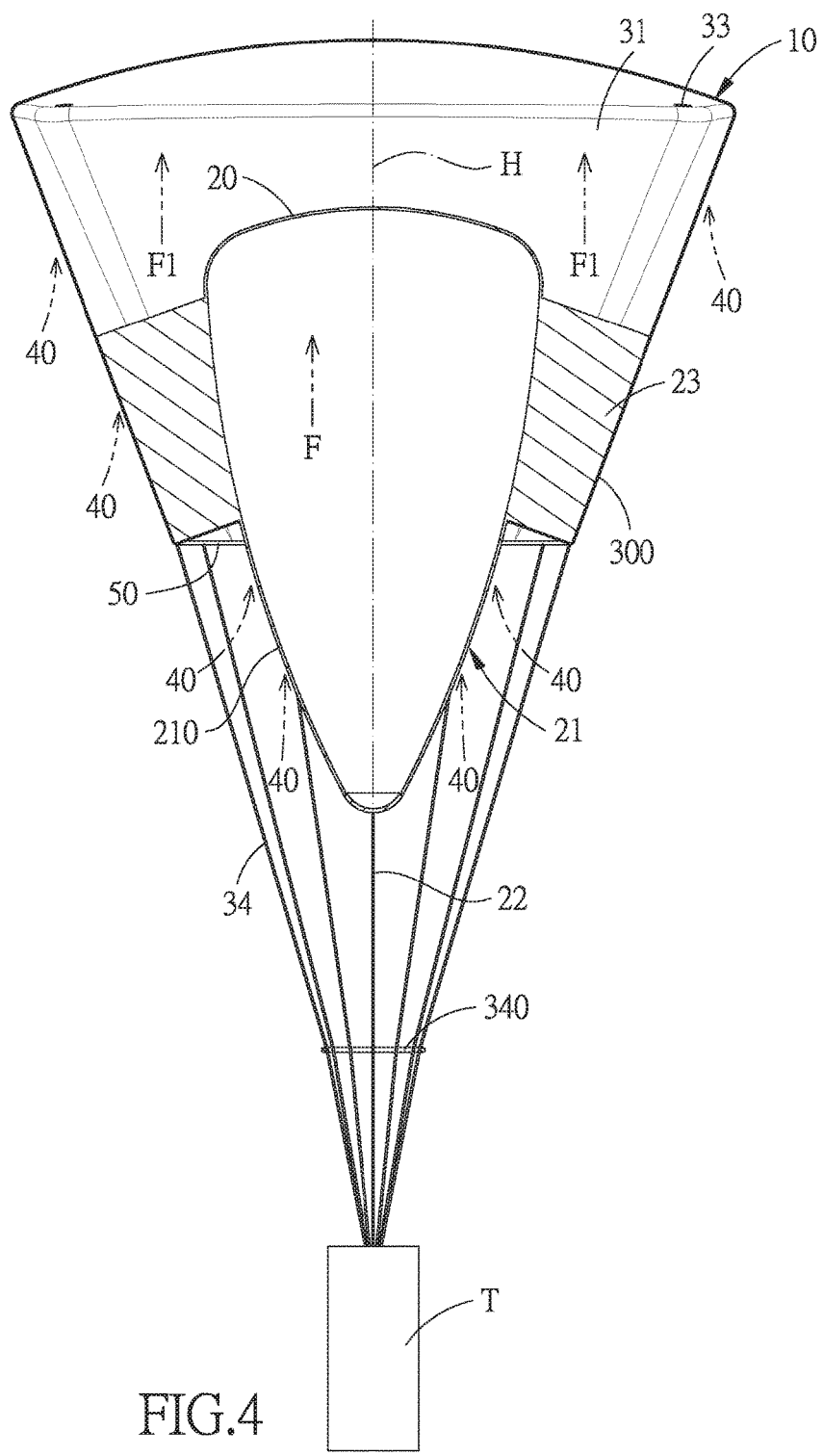
FIG. 4 is another plan view of the coaxial double layer parachute in accordance with the second embodiment of the present invention.

Referring then to FIGS. 3 and 4 the inner inflatable body 20 and the outer canopy 30 are coaxially arranged on the central axis H of the coaxial double layer parachute 10, the inner inflatable body 20 is disposed in the outer canopy 30, and the plastic ring 50 is disposed between the inner inflatable body 20 and a lower end of the outer canopy 30. With the rigid plastic ring 50, the outer canopy 30 covers and can be connected to the inner inflatable body 20. Besides, the inner inflatable body 20 has the plural flexible pieces 23 connected to the inner surface of the outer canopy 30, so that the outer canopy 30 can be smoothly deployed, and the deployed outer canopy 30 has a downward tapered surface 300.

The outer canopy 30 covers the inner inflatable body 20 which is disposed inside the outer canopy 30 while the outer canopy 30 and the inflatable body 20 is defined an inflation space 31. At each of four corners of the top surface of the outer canopy 30 is formed an air exhaust port 33, and to the periphery of the bottom surface 32 are connected plural connecting cords 34 which are annularly arranged. Each of the connecting cords 34 has one end connected to the periphery of the bottom surface 32 and the other end connected to the payload T. Around the connecting cords 34 is disposed a fixing ring 340 which is located adjacent to the payload T.

The formed circular plate 50 made of rigid and extra-light material, like carbon glass, is disposed between the inner inflatable body 20 and a lower end of the outer canopy 30, and provided with a plurality of air inlets 51, which are annularly arranged. The formed circular plate 50 is design to substitute for the bottom surface 32 at the lower end of the outer canopy 30 while the plural air inlets 51 play the same role as the air inlets 320.

Referring then to FIGS. 5 and 6, as indicated in the first embodiment of the present invention, the inner inflatable body 20 and the outer canopy 30 are coaxially arranged on the central axis H of the coaxial double layer parachute 10, the inner inflatable body 20 is disposed inside the outer canopy 30 that has been removed the air inlets 320 and the bottom surface 32.

Secondly, the formed circular plate 50 is disposed between the inner inflatable body 20 and a lower end of the outer canopy 30. With the rigid formed circular plate 50, the outer canopy 30 and the inner inflatable body 20 can not only be bridged, but also be strengthened to withstand the pressure of the stronger air flows and turbulence around their bottom ends.

Thirdly, the plural fabric panels 23, peripherally partitioning the lower section of an inflation space into several sectors as air flow tunnels, is outwardly connected to the inside surface of the outer canopy 30 and inwardly connected to the outside surface of the inner inflatable body 20, so as to prevent mutual deviation of the inner inflatable body 20 and the outer canopy 30 from the central axis H during the descent of the coaxial double layer parachute 10.

Since the inner inflatable body 20 is filled with helium to generate a first buoyance F, which will make the inner inflatable body 20 lift to a certain height since helium is much less dense than air. When the payload T connected to the inner inflatable body 20 and the outer canopy 30 falls, the ambient air flows 40 will be guided to the inflation space 31 via the air inlets 51 to produce a second buoyance F1, which makes the outer canopy 30 open completely.

It is to be noted that the inner inflatable body 20 and the outer canopy 30 can be evenly tightened in axial and radial directions by the fabric panels 23, so that the outer canopy 30 can be kept equidistantly from the inner inflatable body 20. As a result, the air flows 40 can be uniformly filled in the inflation space 31 between the inner inflatable body 20 and the outer canopy 30.

In summary, the coaxial double layer parachute 10 in accordance with the present invention has the following advantages:

First of all, before the payload T gets ready to falls even from a low height, the first buoyance F will make the inner inflatable body 20 gradually lift to a position atop the payload T and then pull tight the restricting cord 22, the connecting cords 34 and the outer canopy 30 since the inner inflatable body 20 is being pre-filled with helium. When the inner inflatable body 20 lifts to a certain height, the ambient air flow 40s will enter the inflation space 31 via the air inlets 51 at the state of one atmosphere. After the payload T falls, the ambient air flows 40 especially surrounding the air flow guiding round-nose 21 will be guided by the air flow guiding round-nose 21 to rush into the inflation space 31 via the air inlets 51 to produce the second buoyance F1 making the outer canopy 30 open completely, so that the coaxial double layer parachute 10 of the present invention can be deployed easily and safely.

Secondly, the inner inflatable body 20 and the outer canopy 30 are located at the same central axis H, and can therefore be maintained at the coaxial position, no matter how heavy a variety of pressures such as the first buoyance F, the second buoyance F1, or/and the air ambient flows 40 inwardly and outwardly exert on them. In other words, the plural fabric panels 23 radially and axially tighten the inner inflatable body 20 and the outer canopy 30, so as to prevent the inner inflatable body 20 and the outer canopy 30 from entanglement or/and coaxial dislocation during the descent of the coaxial double layer parachute 10.

Thirdly, the air exhaust ports 33 are formed at four corners atop the outer canopy 30 to leak a small amount of the air flows 40 from the inflation space 31, which reduce unexpected swing caused by environmental turbulence during the descent of the coaxial double layer parachute 10.

Fourthly, it is highlighted that, according to the aerodynamic theorem as well as the experimental results correlated each other, the outer canopy 30 with a very huge downward tapered surface 300, steadily holds the outmost air flows 40 downwards in order to balance the air flows 40 of the inflation space 31, so as to make the coaxial double layer parachute 10 descend much more stably.

Finally, the formed circular plate 50 made of an extra-light and rigid material like carbon glass is designed to strengthen the structures near the bottom end of the outer canopy 30 and amid the inner inflatable body 20. Nevertheless, the air inlets 51 of the formed circular plate 50 allow the air flows 40 to enter the inflation space 31 to push up the outer canopy 30 more smoothly and effectively.

While we have shown and described various embodiments in accordance with the present invention, it is clear to those skilled in the art that further embodiments may be made without departing from the scope of the present invention.

What is claimed is:

1. A coaxial double layer parachute comprising, an inner inflatable body filled with helium, and an outer canopy which are located along a central axis; the inner inflatable body including an air flow guiding round-nose; the outer canopy covering the inner inflatable body which is disposed inside the outer canopy;

wherein an inflation space is defined between the outer canopy and the inner inflatable body, a formed circular plate is disposed on an outer surface of the inner inflatable body and located between the inner inflatable body and a lower end of the outer canopy, and provided with a plurality of air inlets which are annularly arranged, and a plurality of fabric panels is formed on the outer surface of the inner inflatable body for peripherally partitioning a lower section of the inflation space into several sectors as air flow tunnels, the plurality of fabric panels is outwardly connected to an inside surface of the outer canopy and inwardly connected to the outer surface of the inner inflatable body.

2. The coaxial double layer parachute as claimed in claim 1, wherein the air flow guiding round-nose at a lower section of the inner inflatable body is designed as an arc-shaped surface.

3. The coaxial double layer parachute as claimed in claim 1, wherein at least one air exhaust port is formed at or near each of four corners atop the outer canopy, and a plurality of connecting cords which are annularly arranged each have one end connected to the bottom surface of the outer canopy, and the other end connected to a payload.

4. The coaxial double layer parachute as claimed in claim 1, wherein the outer canopy has a downward tapered surface.

* * * * *